2,920,069
Patented Jan. 5, 1960

2,920,069

PROCESS FOR THE MANUFACTURE OF AZOPHOSPHONIC ACID ESTERS

Fritz Suckfull, Leverkusen, and Heinz Haubrich, Koln, Germany, assignors to Farbenfabriken Bayer Aktiengesellschaft, Leverkusen, Germany, a corporation of Germany No Drawing. Application December 13, 1956
Serial No. 627,993

Claims priority, application Germany December 19, 1955

4 Claims. (Cl. 260—141)

This invention relates to novel azophosphonic acid esters and a process for their production.

It has been found that valuable new azophosphonic acid esters are obtained by reacting diazo compounds with dialkyl esters of phosphorous acid.

The novel azophosphonic acid esters can be represented by the following formula $R-N=N-PO(OR_1)_2$ wherein R stands for an aromatic or heterocyclic radical which can be further substituted and wherein $R_1$ stands for alkyl radicals.

The process for their production can be illustrated by the following reaction scheme in which the diazo compound of 4-nitroaniline is reacted with dimethyl phosphite:

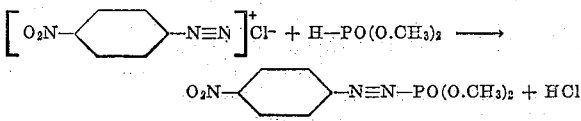

Diazo compounds suitable for the process according to the invention are those whose diazonium group is linked to an aromatic or heterocyclic radical. As examples there may be mentioned the diazonium derivatives of benzene, naphthalene, diphenyl, pyridine and thiazole. These compounds may be further substituted, for instance by alkyl-, alkyloxy-, halogen-, nitro-, acylamino-, carboxylic acid- or sulfonic acid groups. The diazo compounds can be obtained in known manner from the corresponding amino compounds.

Suitable dialkyl esters of phosphorous acid are for example the lower alkyl esters such as the dimethyl phosphite or diethyl phosphite which may be obtained in known manner.

The reaction of the diazo compounds with the dialkyl esters of phosphorous acid may be effected by reacting the two components in an inert medium such as in water or an inert organic solvent e.g. methanol, ethanol, acetonitrile, dioxane or tetrahydrofurane. The reaction can be carried out in a weakly acid, neutral or weakly alkaline medium. In general a pH of 4–8 is suitable while a pH of 5–7 is preferably applied. To neutralize the acid formed during the process there can be added suitable acid-binding agents such as sodium acetate or sodium bicarbonate.

The reaction has to be carried out at temperatures at which the diazo compounds used are stable. Temperatures of about 0–40° C., preferably 0–20° C. yield in general satisfying results while in some cases also higher temperatures may be employed.

If the diazo compounds used do not carry any free carboxylic acid or sulfonic acid groups, the reaction products thus obtained are water-insoluble but readily soluble in organic solvents. They separate out in the form of red-colored crystals or as red oils. The reaction products containing sulfonic acid groups are more or less readily water-soluble; they also have an orange to red color. The working up can accordingly be effected in known manner by simple filtration, shaking out with chloroform and the like or by salting out.

The azophosphonic acid esters obtainable according to the invention do not show a diazo reaction with regard to the coupling components. If they are dissolved in a strong acid, for example concentrated sulfuric acid, the reacted diazo compound is formed again with a brightening of color. The new compounds are thermally comparatively stable. The azophosphonic acid esters very easily obtainable and in good yield by the process according to the invention may be used for example as intermediates for dyestuffs or for the preparation of organic hydrazines which are useful intermediates e.g. for the preparation of dyestuffs.

The following examples are given for the purpose of illustrating the invention, the parts by weight and the parts by volume being in the ratio of kilograms to liters.

*Example I.—(4-nitrobenzene-azo)-phosphonic acid dimethylester*

13.8 parts by weight of 4-nitroaniline are dissolved with 25 parts by volume of water and 28 parts by volume of hydrochloric acid 19.5° Bé. at boiling temperature and poured onto about 50 parts by weight of ice. After the addition of 23 parts by volume of a 30 percent sodium nitrite solution, the diazo solution thus obtained is clarified with a little adsorption charcoal. The solution is rendered neutral to Congo with 20 parts by volume of a 20 percent sodium acetate solution at 10° C. with stirring and immediately afterwards treated with a solution of 12 parts by weight of dimethyl phosphite in 25 parts by volume of water. The mixture is then slowly neutralized with 12 parts by weight of sodium bicarbonate. The reaction is completed after 2–3 hours at 10° C. The reaction product has separated out in the form of red crystals in very good yield. It is filtered off with suction, washed with water and dried. After re-crystallisation from methanol, crude red crystals of melting point 119° C. are obtained. The yield is 95–98 percent of the theoretical. The compound has the following constitution:

and the formula $C_8H_{10}O_5N_3P$.

Calculated: C, 37.08%; H, 3.89%; N, 16.21%; P, 11.95%. Found: C, 37.40%; H, 3.90%; N, 16.14%; P, 12.00%.

The compound is insoluble in water but dissolves in organic solvents with a red color. It does not show any coupling reaction.

*Example II.—(4-nitro-benzene-azo)-phosphonic acid diethylester*

When replacing in Example 1 the 12 parts by weight of dimethyl phosphite by 15.2 parts by weight of diethyl phosphite and proceeding in a similar manner, red crystals are obtained which melt at 48–49° C. The yield is 90–95 percent of the theoretical. The compound has the following constitution:

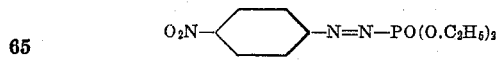

and the formula $C_{10}H_{14}O_5N_3P$.

Calculated: C, 41.82%; H, 4.92%; N, 14.63%; P, 10.78%. Found: C, 42.00%; H, 4.85%; N, 14.62%; P, 10.55%.

The properties of the product are similar to those of the dimethyl compound.

Example III.—Benzene-azo-phosphonic acid dimethylester 9.4 parts by weight of aniline are diazotized in usual manner with 6.9 parts by weight of sodium nitrite. When further proceeding as indicated in Example I but within a temperature range of 0–5° C., the reaction is completed after 5–6 hours and the product has separated out as a red oil. It is shaken out with 50 parts by volume of chloroform, the chloroform solution is dried with calcium chloride and the chloroform distilled off under vacuum. The product obtained in nearly quantitative yield is a red oily liquid and has the following constitution:

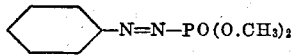

It is insoluble in water but dissolves in organic solvents with a red color.

Example IV.—(4-chlorobenzene-azo)-phosphonic acid dimethylester 12.8 parts by weight of 4-chloroaniline are dissolved with 25 parts by volume of water and 28 parts by volume of hydrochloric acid 19.5° Bé. at boiling temperature and poured onto about 50 parts by weight of ice. When further proceeding as described in Example III, a red oil is obtained which is shaken out with parts by volume of chloroform. The chloroform solution is dried with calcium chloride, the chloroform distilled off under vacuum and the residue taken up with 10 parts by volume of methanol. When cooling to $-10$ to $-15°$ C., the compound crystallizes out, but it melts together to form a red oil a few degrees above 0° C. The yield is more than 95 percent of the theoretical. The compound has the following constitution:

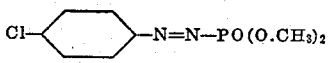

It is insoluble in water but dissolves in organic solvents with a red color.

Example V.—(3,5 - dichloro - benzene - azo) - phosphonic acid dimethylester 16.2 parts by weight of 3,5-dichloro-aniline are dissolved with 25 parts by volume of water and 28 parts by volume of hydrochloric acid 19.5° Bé. at boiling temperature and poured onto about 60 parts by weight of ice. After the addition of 23 parts by volume of a 30 percent sodium nitrite solution, the diazo solution thus formed is clarified with a little adsorbent charcoal. The solution is rendered neutral to Congo with 20 parts by volume of a 20 percent sodium acetate solution at 0–5° C. with stirring and immediately afterwards treated with a solution of 12 parts by weight of dimethyl phosphite in 25 parts by volume of water. The mixture is then slowly neutralized with 12 parts by weight of sodium bicarbonate. The reaction is completed after 4–5 hours and the reaction product has separated out in brick-red crystals. It is filtered off with suction, washed with water and dried. After re-crystallization from methanol, small orange colored crystals are obtained which melt at 67° C. The yield is 95 to 97 percent of the theoretical. The compound has the following constitution:

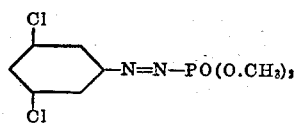

and the formula $C_8H_9O_3N_2Cl_2P$.

Calculated: C, 33.95%; H, 3.20%; N, 9.90%; Cl, 25.05%; P, 10.95%. Found: C, 34.00%; H, 3.05%; N, 9.69%; Cl, 24.65%; P, 11.10%.

The compound is insoluble in water but dissolves in organic solvents with a red color.

Example VI.—(4-acetylamino-benzene-azo)-phosphonic acid dimethylester 15 parts by weight of 4-acetamino-aniline are dissolved with 25 parts by volume of water and 28 parts by volume of hydrochloric acid 19.5° Bé. and poured onto about 60 parts by weight of ice. 23 parts by volume of a 30 percent sodium nitrite solution and, after the nitrite reaction has subsided, 20 parts by volume of a 20 percent sodium acetate solution, are added thereto. Immediately afterwards a solution of 12 parts by weight of dimethyl phosphite in 25 parts by volume of water is added to the mixture which is treated with portions of a total of 12 parts by weight of sodium bicarbonate. The reaction is completed after 4–5 hours at a temperature somewhat below 0° C. The product has separated out in brownish red crystals. It is filtered off with suction, washed with ice-cold water and dried. The compound melts at 134° C. with decomposition. The yield is 87 percent of the theoretical. The compound has the following constitution:

and the formula $C_{10}H_{14}O_4N_3P$.

Calculated: C, 44.29%; H, 5.20%; N, 15.49%; P, 11.42%. Found: C, 44.68%; H, 5.30%; N, 15.40; P, 11.65%.

It is insoluble in water and ether but dissolves in methanol with an orange-red color.

Example VII.—(4-carbethoxy-benzene-azo)-phosphonic acid dimethylester 16.5 parts by weight of 4-aminobenzoic acid ethylester are dissolved with 30 parts of volume of water and 28 parts by volume of hydrochloric acid (19° Bé.) and poured onto about 50 parts by weight of ice. 23 parts by volume of a 30 percent sodium nitrite solution and, after the nitrtite reaction has subsided, 20 parts by volume of a 20 percent sodium acetate solution are added thereto. Subsequently a solution of 12 parts by weight of dimethyl phosphite in 25 parts by volume of water is added to the mixture which is treated with portions of a total of 12 parts by weight of sodium bicarbonate, the temperature being kept at 0° C. After 5–6 hours the reaction is completed. The reaction product separates out in brownish red crystalline leaflets. It is filtered off with suction, washed with ice-cold water and dried. The compound is formed in very good yield (approximately 80 percent of the theoretical); it shows a melting point of 34–35° C. and has the following constitution:

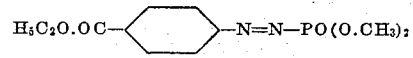

and the formula $C_{11}H_{15}O_5N_2P$.

Calculated: C, 46.16%; H, 5.28%; N, 9.79%; P, 10.82%. Found: C, 46.65%; H, 5.60%; N, 9.45%; P, 10.85%.

The compound is nearly insoluble in water but dissolves in organic solvents with a red color. It does not show any coupling reactions.

Example VIII.—Diphenyl-4,4'-bis-(azo-phosphonic acid dimethylester)

18.4 parts by weight of 4,4'-diaminodiphenyl are tetrazotized in known manner with 13.8 parts by weight of sodium nitrite. The tetrazo solution is treated at 0° C. with 50 parts by volume of a 20 percent sodium acetate solution and 24 parts by weight of dimethyl phosphite dissolved in a little water. Immediately afterwards portions of a total of 20 grams of sodium bicarbonate are added thereto within 20 minutes. Within a few hours the reaction product has separated out as a red oil which is taken up with 200 parts by volume of chloroform.

After washing with water the chloroform solution is dried with calcium chloride and concentrated by evaporation under vacuum. The yield is about 75 percent of the theoretical. The reaction product has the following constitution:

It remains behind as a red oil, is insoluble in water but readily soluble in organic solvents.

*Example IX.—(4-benzene-azo-benzene-azo)-phosphonic acid dimethylester*

19.7 parts by weight of 4-amino-azobenzene are diazotized in usual manner at 20° C. with 6.9 parts by weight of sodium nitrite. The clarified diazo solution is treated with sodium acetate, dimethyl phosphite and sodium bicarbonate according to the instructions of Example I. The reaction product has separated out in brownish red crystals after 5 hours which are filtered off, washed with water and dried. After re-crystallization from ligroin or alcohol, highly glossy brownish crystals of melting point 91° C. are obtained in nearly quantitative yield. The compound has the following constitution:

Calculated: C, 52.83%; H, 4.75%; N, 17.60%; P, 9.73%. Found: C, 52.85%; H, 5.10%; N, 17.50%; P, 9.90%.

It is insoluble in water but readily soluble in organic solvents.

*Example X.—Sodium salt of (4-nitro-2-sulpho-benzene-azo)-phosphonic acid dimethylester*

21.8 parts by weight of 4-nitro aniline-2-sulphonic acid are diazotized in usual manner with 6.9 parts by weight of sodium nitrite. When further proceeding as described in Example I but at 10–15° C., the diazo reaction has subsided after 3–4 hours and a clear red solution is formed. From this solution the reaction product may be salted out by saturation with sodium chloride. It is filtered off with suction, washed with a little 20 percent sodium chloride solution and dried. The product forms red-coloured crystals which have the following constitution:

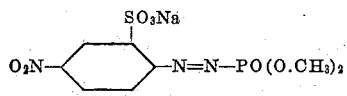

The yield is 60–70 percent of the theoretical. The compound dissolves in water. It does not show a diazo reaction.

*Example XI.—Sodium salt of (6-sulpho-naphthyl-2-azo)-phosphonic acid dimethylester*

22.3 parts by weight of 2-naphthylamine-6-sulphonic acid are diazotized in usual manner with 6.9 parts by weight of sodium nitrite. When further proceeding as described in Example I, the diazo reaction has subsided after 1–2 hours. From the clear orange-coloured reaction solution the reaction product which has the following constitution:

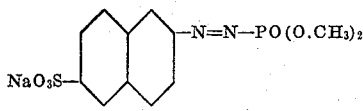

can be separated out in the form of red crystals by over-saturation with sodium chloride at a low temperature. The yield is 65–75 percent of the theoretical. The compound is very readily soluble in water and does not show a diazo reaction.

To the compound dissolved in water 30 parts by volume of acetic acid (50%) and 30 parts by weight of zinc dust are added. A nearly colorless solution is obtained upon treatment with active carbon which contains (6-sulfo-naphthyl-2-hydrazo)-phosphonic acid dimethyl ester. To this solution 100 parts by volume of sulfuric acid (40° Bé.) are added. The reaction mixture is heated for 20 minutes to about 90° C. whereby nearly colorless crystals precipitate. Upon cooling the crystals of 2-naphthyl-hydrazo-6-sulfonic acid of the formula

are recovered by filtering off. Yield 85%. The compound reduces Fehling's solution at once.

From the compound thus obtained dyestuffs can be obtained as described in German patent specification 596,754 and the Bios Final Report 986, page 353.

*Example XII.—Disodium salt of [4-(7-sulpho-6-methyl-benzothiazolyl - 2) - 2 - sulpho - benzene - azo] - phosphonic acid dimethylester*

40 parts by weight of dehydro-thiotoluidine-disulphonic acid are diazotized in known manner at 40° C. with 6.9 parts by weight of sodium nitrite. After cooling to 20° C., 25 parts by volume of a 20 percent acetate solution and 12 grams of dimethyl phosphite dissolved in a little water are added and the mixture is subsequently treated with 11 parts by weight of sodium bicarbonate for 45 minutes. The reaction mixture becomes temporarily thinly liquid, then very stiff. After 2½ hours the reaction product which has the following constitution

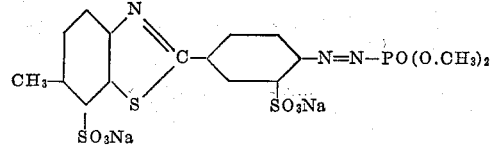

has separated out in orange-coloured crystals. It is water-soluble and does not show a diazo reaction. The yield is nearly quantitative.

*Example XIII.—(4-benzene-sulphonyloxy-benzene-azo)-phosphonic acid dimethylester*

24.9 parts by weight of benzene-sulphonyloxy acid-(4-aminophenylester) are diazotized in usual manner at 5–10° C. with 23 parts by volume of a 30 percent sodium nitrite solution. When further proceeding at the same temperature as described in Example I, the reaction is completed after 4–5 hours and the product has separated out as a red oil. The yield is nearly quantitative. The compound has the following constitution:

It is insoluble in water but dissolves in organic solvents with a red color.

The compound obtained is dissolved in 30 parts by volume of methanol and 30 parts by volume of a 50% acetic acid. Thereafter 15 parts by weight of zinc dust are added in portions at a temperature of about 30° C. The mixture is then cooled to about 0–5° C., the precipitate is sucked off and extracted with hot methanol. If the methanolic solution obtained is cooled to 0° C. colorless crystals of (4-benzene-sulfonyloxy benzene-hydrazo) phosphonic acid dimethylester of the formula

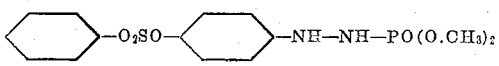

are obtained.

37.2 parts of this compound are heated in a mixture consisting of 35 parts by volume of water and 35 parts by volume of a concentrated hydrochloric acid solution for about 30 minutes to a temperature of 90° C. whereby a clear solution is obtained. Upon cooling 4-benzene-sulfonyloxy-benzene hydrazine hydrochloride of the formula

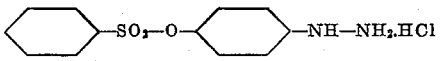

is obtained. Yield 80%.

*Example XIV.—(2 - methyl - 4 - nitro-benzene-azo)-phosphonic acid dimethylester*

15.2 parts by weight of 5-nitro-2-toluidine are diazotized in usual manner with 6.9 parts by weight of sodium nitrite. When proceeding further as described in Example I but at 0–5° C., the reaction is completed after 3–4 hours. The red crystals thus formed are filtered off with suction and re-crystallized several times from methyl alcohol. The yield is 90–93 percent of the theoretical. The compound which melts at 52–53° C. has the following constitution:

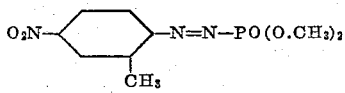

It is very readily soluble in alcohol and other organic solvents but barely in water.

*Example XV.—(2.5 - dichloro - benzene-azo)-phosphonic acid dimethylester*

16.2 parts by weight of 2.5-dichloro-aniline are diazotized in known manner with 6.9 parts by weight of sodium nitrite. When further proceeding as described in Example I, the phosphonic acid dimethylester is obtained in pale violet-pink crystals which melt at 75° C. The yield is 95 percent of the theoretical. The compound has the constitution:

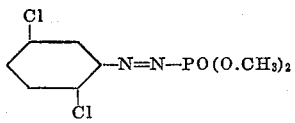

and the formula $C_8H_9O_3N_2Cl_2P$.

Calculated: C, 33.94%; H, 3.20%; N, 9.90%; Cl, 25.05%; P, 10.94%. Found: C, 34.28%; H, 3.64%; N, 9.70%; Cl, 24.85%; P, 11.05%.

The compound is readily soluble in alcohol but sparingly in water.

*Example XVI.—(2.3 - dichloro-benzene-azo)-phosphonic acid dimethylester*

When replacing in Example XV the 16.2 parts by weight of 2.5-dichloro-aniline by an equal amount of 2.3-dichloro-aniline and otherwise proceeding similarly, bright red crystals are obtained which melt at 53° C. The yield is 94–97 percent of the theoretical. The compound has the constitution:

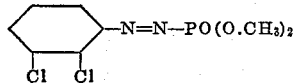

and the formula $C_8H_9O_3N_2Cl_2P$.

Calculated: C, 33.94%; H, 3.20%; N, 9.90%; Cl, 25.05%; P, 10.94%. Found: C, 34.15%; H, 3.50%; N, 9.87%; Cl, 24.75%; P, 11.10%.

The properties of the product are similar to those of the compound obtained according to the process of Example 15.

*Example XVII*

2 parts by weight of 3-aminopyridine are diazotized with cooling to 0–5° C. with 12 parts by volume of 20 percent hydrochloric acid and 15 parts by volume of 10 percent sodium nitrite solution. The mixture is then clarified with a little adsorption charcoal, a sodium acetate solution is added at 0–5° C. until the reaction is neutral to Congo, and the product is then treated with a solution of 2.6 parts by weight of dimethyl phosphite in 25 parts by volume of water. The mixture is then slowly neutralised with 12 parts by weight of sodium bicarbonate. After standing for 4–5 hours, the mixture is extracted with chloroform, and a clear red solution is thus obtained from which a compound which has the constitution:

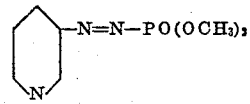

can be obtained as a red oil by evaporation of the chloroform under vacuum. The oil dissolves very readily in alcohol and with somewhat more difficulty in water.

We claim:
1. A compound of the formula

$$R\!-\!N\!=\!N\!-\!PO(OR_1)_2$$

wherein R stands for a member selected from the group consisting of benzene, naphthalene and pyridine series and wherein $R_1$ stands for lower alkyl radicals.

2. A process for the manufacture of azophosphonic acid esters which comprises reacting a diazonium compound selected from the group consisting of the benzene, naphthalene and pyridine series with di-lower-alkyl esters of phosphorous acid in an inert medium at a temperature of about 0–40° C. and recovering the reaction product formed.

3. The process as claimed in claim 2, wherein the reaction is carried out in the presence of an acid binding agent.

4. The process as claimed in claim 2, wherein the reaction is carried out at a pH of about 5–7.

References Cited in the file of this patent

UNITED STATES PATENTS

| | | |
|---|---|---|
| 1,093,567 | Witt | Apr. 14, 1914 |
| 2,266,229 | May | Dec. 16, 1941 |

OTHER REFERENCES

Saunders: "The Aromatic Diazo Compounds," 2nd ed., 1949, pp. 147–152.